April 2, 1963     E. F. HUDDLE     3,083,972
SEAL FOR BEARINGS
Filed June 15, 1960

INVENTOR.
Edwin F. Huddle
Paul O. Rippel
Atty.

United States Patent Office 3,083,972
Patented Apr. 2, 1963

3,083,972
SEAL FOR BEARINGS
Edwin F. Huddle, Elmwood Park, Ill., assignor to International Harvester Company, Chicago, Ill., a corporation of New Jersey
Filed June 15, 1960, Ser. No. 36,365
1 Claim. (Cl. 277—13)

This invention relates to a seal for bearings and the like to prevent the entry of dirt thereinto.

A general object of the invention is to provide a novel seal wherein a pair of sealing elements are arranged to provide a labyrinthian path to prevent the entry of dirt into the bearing.

A general object of the invention is to provide a novel seal comprising a pair of axially telescoped elements with portions arranged in radial as well as axial overlapping relationship and wherein the usual wiper element is eliminated.

A further object of the invention is to provide a novel seal in which the telescoping parts are so arranged that they may be optionally either filled with grease or left void and wherein in one instance the grease is to entrap dirt and in the other instance the parts function to provide a labyrinthian passage which resists the entry of dirt and the like.

These and other objects of the invention become more apparent from the specification and the drawings, wherein.

Figure 1:
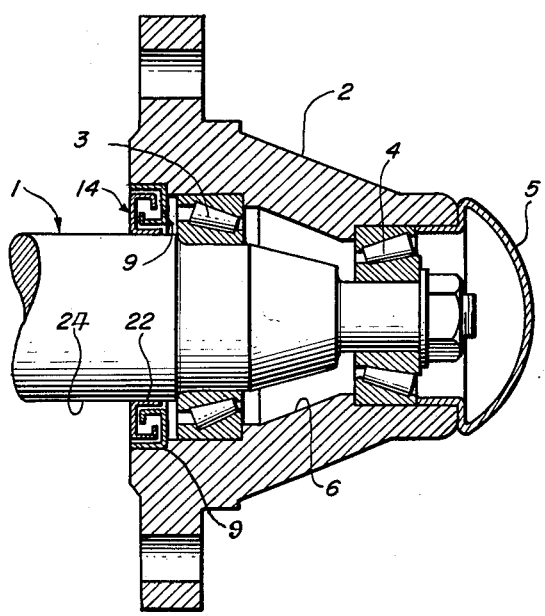
FIGURE 1 is a radial sectional view illustrating the invention applied to a wheel mounting.
Figure 2:
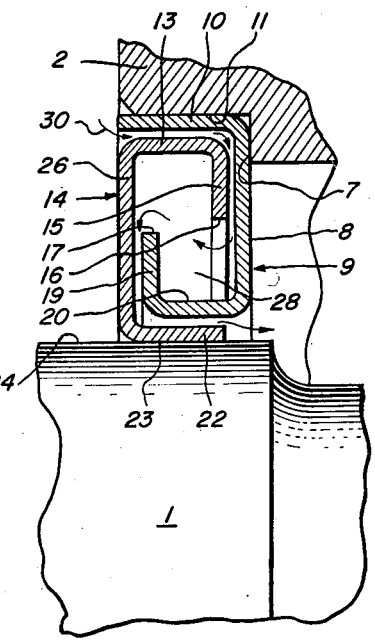
FIGURE 2 is an enlarged fragmentary radial sectional view of the seal.
Figure 3:
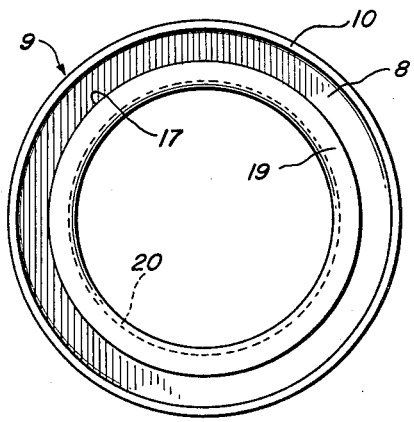
FIGURE 3 is an inner side view of the outer seal members.
Figure 4:
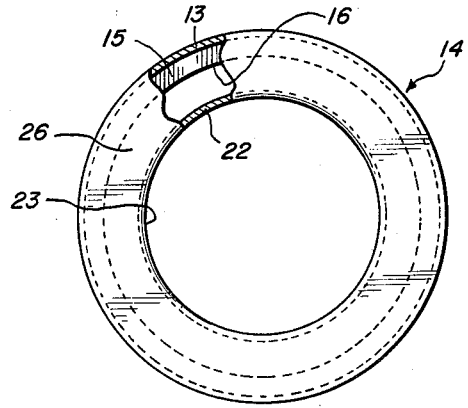
FIGURE 4 is an outer side view partially in section of the inner sealing member.

Describing the invention in detail and having particular reference to the drawings, there is shown a typical wheel and axle construction comprising an axle 1 with a surrounding hub 2 and intervening bearing assemblies 3 and 4, one end of the hub being capped by the cap structure 5 which closes the outer end of the bore 6. The inner end of the bore is enlarged to provide an outwardly facing shoulder 7 which affords a seat for the radial wall 8 of the outer sealing element 9 which comprises an outwardly directed axial annulus or flange 10 fitted into the counterbore 11 and radially outwardly spaced from the inwardly directed annular flange or annulus 13 of the radial inner sealing element generally designated 14. The ring portion 13 merges into the outer periphery of an inner radial flange portion 15 which has a central annular opening 16 which is of slightly greater diameter than the annular periphery 17 of the radially outwardly extending flat plate or flange or barrier portion 19 formed integral with the axially outer edge of the radially inner flange or annulus 20 of the outer sealing member 9, the said annulus 20 merging at its axially inner edge into the lower edge of the upright radial inner wall portion 8 of the outer sealing element. The flange portion 20 is radially outwardly spaced from the inner annular axially extending flange or portion 22 of the inner sealing element 14, said flange portion 22 providing a bore 23 snugly admitting the enlarged periphery 24 of the spindle or axle 1, as well illustrated in FIGURES 1 and 2.

The axial outer edge portion of the flange 22 merges into the radially inner edge of the upright shield or barrier wall 26 which is preferably annular, said wall 26 paralleling the flange 19 of the inner member and closely spaced axially with respect thereto and merging at its radially outer edge with the axially outer edge of the flange portion 13. It will be understood that a space is developed at 28 between the opposing radially reversely directed flange portions 15 and 19 and the axially reversely directed flange portions 20 and 13 as well as the generally parallel radial wall portions 8 and 26 and this space 28 is either filled with grease or is empty. In the empty condition it will be seen that a labyrinthian passageway as outlined by the arrow line 30 is provided between the two sealing elements 9 and 14 and that the function, particularly of the radial portions 8, 15, 19 and 26 of the two sealing members, is to discharge the material radially outwardly if it should impinge thereagainst as the two members are relatively rotatable. In the specific embodiment herein disclosed naturally the inner member is stationary and the outer member rotates within and about the inner member, therefore the centrifugal throwing function and any blowing which may occur is accomplished by the radial portions 8 and 19.

It will be understood that the two elements of the seal have no physical contact with one another and therefore do not wear.

The instant arrangement has been found to provide an effective seal under certain conditions and under such conditions have been operated successfully for many hours.

What is claimed is:

In a metallic seal comprising inner and outer relatively rotatable elements, each element having a radial wall and inner and outer annular codirectional axial flanges connected to the wall, the inner flange of the outer element interposed between the flanges of the inner element and spaced closely adjacent to the inner flange of the inner element, the flanges of the respective elements terminating closely adjacent to the radial wall of the other element, and radial webs of substantial extent on the outer flange of the inner element and the inner flange of the outer element directed toward each other and axially spaced and disposed closely adjacent to the radial wall of the other element, the radial web on the outer flange having an opening therein of a diameter slightly greater than the diameter of the radial web on the inner flange.

References Cited in the file of this patent
UNITED STATES PATENTS

| | | |
|---|---|---|
| 1,420,416 | Dlesk | June 20, 1922 |
| 2,750,214 | Bermingham | June 12, 1956 |
| 2,834,618 | Wiltse | May 13, 1958 |